Patented Aug. 30, 1949

2,480,342

UNITED STATES PATENT OFFICE 2,480,342

METAL DERIVATIVES OF ORTHO-CARBAMYL-BENZENETHIOL

Norbert Steiger, Nutley, and Oscar Keller, Clifton, N. J., assignors to Hoffmann-La Roche Inc., Nutley, N. J., a corporation of New Jersey No Drawing. Application June 14, 1946, Serial No. 676,862

11 Claims. (Cl. 260—429)

This invention relates to new metal compounds of o-carbamyl-benzenethiol and to their manufacture.

We have found that compounds of the formula:

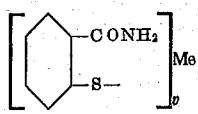

where Me is metal and $v$ is its valence can be prepared by reacting a solution of carbamyl-benzenethiol (as solvents can be used alcohol, acetone, N NaOH, etc.) with solutions of metal salts in a suitable solvent. For example, the zinc mercaptide can be made by dissolving carbamyl-benzenethiol in N NaOH and adding an aqueous solution of zinc chloride in the presence of strongly diluted acetic acid. The bismuth compound can be made by the precipitation of a solution of carbamyl-benzenethiol in acetone with $BiCl_3$ dissolved in acetone. The mercury compound is made by reacting the alcoholic solution of the mercaptan with an aqueous solution of mercuric acetate, etc.

The carbamyl-benzenethiol can be made according to German Patent 570,364.

The new metal compounds have a remarkable fungicidal and bactericidal activity. As they are very little soluble in water, they are either brought in a fine suspension with the aid of a suitable dispersion agent, or they are made up as an ointment. For dry application a 5 to 10% talcum powder can be used.

The new compounds have the following structural formula:

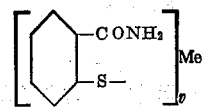

wherein $v$ is the valence of the metal Me.

Preparation of o-carbamyl-benzenethiol

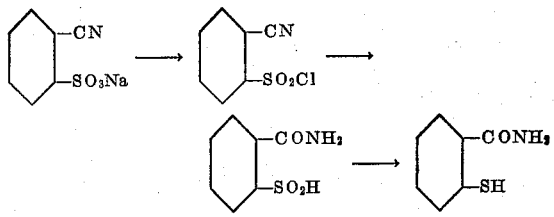

450 cc. monochlorbenzene and 150 grams $PCl_5$ were gradually heated up to 90–95° C. in water bath with 105 grams of the sodium salt of o-cyano-benzenesulfonic acid. The heating was continued for 3 hours, and the reaction mixture was allowed to cool overnight.

The mixture was cooled to 5° C. and 300 cc. 10 N $H_2SO_4$ were added dropwise keeping the temperature under 15° C. 120 grams zinc dust were then added in small portions at 15° C., followed by addition of 60 grams zinc dust. The mixture was then stirred in the cold overnight.

The chlorobenzene was distilled off below 65° C. in vacuo. The residue was suspended in about 2 liters of ice and water and the gray precipitate was filtered off. The precipitate was washed with 750 cc. cold water and then thoroughly triturated with 250 cc. 5% sodium acetate solution. After filtration, the precipitate was dissolved in 600 cc. N 2NaOH. The insoluble matter was filtered off and the clear filtrate was acidified to congo with HCl.

After cooling in the icebox overnight the white precipitate was filtered off, washed with cold water and dried in vacuo at room temperature. The product was o-carbamyl-benzenethiol.

EXAMPLE 1

Zinc derivative of o-carbamyl-benzenethiol 15.5 grams of o-carbamyl-benzenethiol were dissolved in 1000 cc. $H_2O$ containing 110 cc. N NaOH. The turbid solution was filtered and the filtrate was slowly added to a solution of 100 cc. 25% $ZnCl_2$ and 100 cc. $H_2O$. 5 cc. 10% acetic acid were then added. The precipitated zinc compound was filtered off, washed with cold water and dried in vacuo at room temperature. The product was:

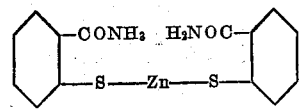

EXAMPLE 2

Mercury derivative of o-carbamyl-benzenethiol 3.1 grams of o-carbamyl-benzenethiol were dissolved in about 15 cc. hot alcohol. To this were added a solution of 3.5 grams mercuric acetate in about 40 cc. water and 10 drops glacial acetic acid. The reaction mixture was well stirred and was cooled. The precipitate was filtered off, washed with water and dried in vacuo. The product was:

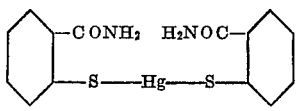

EXAMPLE 3
*Silver derivative of o-carbamyl-benzenethiol*

3.1 grams of o-carbamyl-benzenethiol were dissolved in 40 cc. hot water containing excess $NH_4OH$. To the solution were added 3.7 grams $AgNO_3$ in excess $NH_4OH$. The yellow precipitate was cooled, filtered off, washed with water and dried. The product was:

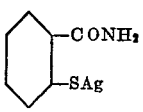

EXAMPLE 4
*Bismuth derivative of o-carbamyl-benzenethiol*

6.2 grams of o-carbamyl-benzenethiol were dissolved in 30 cc. hot alcohol. To this was added a hot acidified alcoholic solution of 4.7 grams $BiCl_3$. The clear yellow solution was diluted with water. The yellow precipitate was filtered off, washed with water and dried. The product was:

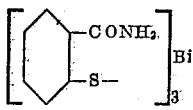

Instead of alcohol, acetone can be employed.

EXAMPLE 5
*Copper derivative of o-carbamyl-benzenethiol*

3.1 grams o-carbamyl-benzenethiol were dissolved in 20 cc. hot alcohol. The solution was added to 2.2 grams cupric acetate in 100 cc. alcohol. The resulting solution was diluted with water and cooled. The gray precipitate was filtered off, washed with water and dried. The product was:

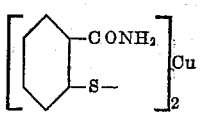

EXAMPLE 6
*Gold derivative of o-carbamyl-benzenethiol*

4.6 grams of o-carbamyl-benzenethiol were dissolved in 15 cc. hot alcohol. To this were added 3.55 grams gold chloride in about 10 cc. alcohol. The mixture was well stirred and was cooled. The white precipitate was filtered off, washed with water and dried. The product was:

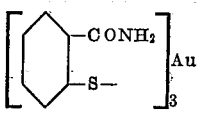

We claim:
1. Compounds of the general formula:

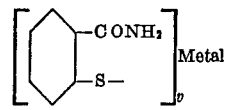

wherein the metal is selected from the group consisting of silver, gold, zinc, copper, mercury and bismuth, and $v$ is the valence of the metal.

2. Compound of claim 1 wherein the metal is zinc.

3. Compound of claim 1 wherein the metal is copper.

4. Compound of claim 1 wherein the metal is bismuth.

5. Process of making compounds of the general formula:

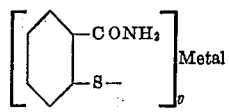

wherein the metal is selected from the group consisting of silver, gold, zinc, copper, mercury and bismuth, and $v$ is the valence of the metal, which comprises reacting carbamyl-benzenethiol with a metal salt selected from the group consisting of soluble salts of silver, gold, zinc, copper, mercury, and bismuth.

6. Process according to claim 5 in which the reagents react in solution form.

7. Process according to claim 5 in which an aqueous solution of the salt is employed.

8. Process according to claim 5 employing zinc chloride.

9. Process according to claim 5 employing bismuth chloride.

10. Process according to claim 5 employing cupric acetate.

11. Process according to claim 5 employing o-carbamyl-benzenethiol dissolved in ethanol.

NORBERT STEIGER.
OSCAR KELLER.

REFERENCES CITED

The following references are of record in the file of this patent:

UNITED STATES PATENTS

| Number | Name | Date |
|---|---|---|
| 1,689,366 | Schoeller et al. | Oct. 30, 1928 |
| 1,876,928 | Herz et al. | Sept. 13, 1932 |
| 2,130,321 | Kharasch | Sept. 13, 1938 |

FOREIGN PATENTS

| Number | Country | Date |
|---|---|---|
| 265,777 | Great Britain | Feb. 17, 1927 |
| 555,141 | Great Britain | Aug. 5, 1943 |
| 560,094 | Great Britain | Mar. 20, 1944 |
| 570,364 | Germany | Feb. 15, 1933 |

OTHER REFERENCES

Reissert et al., Chemical Abstracts, vol. 22, pages 4114–5 (1928).